United States Patent
Borran et al.

(10) Patent No.: US 8,315,207 B2
(45) Date of Patent: Nov. 20, 2012

(54) ASSOCIATION WITH LEAKAGE-BASED METRICS IN A WIRELESS NETWORK

(75) Inventors: Mohammad J. Borran, San Diego, CA (US); Aamod D. Khandekar, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 316 days.

(21) Appl. No.: 12/725,157

(22) Filed: Mar. 16, 2010

(65) Prior Publication Data

US 2010/0238827 A1    Sep. 23, 2010

Related U.S. Application Data

(60) Provisional application No. 61/161,655, filed on Mar. 19, 2009.

(51) Int. Cl.
*H04W 4/00* (2009.01)
*G01R 31/08* (2006.01)

(52) U.S. Cl. .......................... 370/328; 370/252; 370/332

(58) Field of Classification Search ........................ None
See application file for complete search history.

(56) References Cited

U.S. PATENT DOCUMENTS

| 2003/0186653 | A1 | 10/2003 | Mohebbi et al. |
| 2004/0018843 | A1 | 1/2004 | Cerwall et al. |
| 2004/0203781 | A1* | 10/2004 | Lefkowitz ..................... 455/436 |
| 2009/0088174 | A1* | 4/2009 | Kikuchi et al. ................ 455/450 |
| 2009/0247067 | A1* | 10/2009 | Li et al. ............................. 455/7 |
| 2010/0081397 | A1* | 4/2010 | Lee et al. ....................... 455/108 |

FOREIGN PATENT DOCUMENTS

WO    WO9917582 A1    4/1999

OTHER PUBLICATIONS

International Search Report and Written Opinion—PCT/US2010/028059, International Search Authority—European Patent Office—Jun. 30, 2010.

* cited by examiner

*Primary Examiner* — Kwang B Yao
*Assistant Examiner* — Jutai Kao
(74) *Attorney, Agent, or Firm* — Florin Corie; Nerrie M. Zohn

(57) ABSTRACT

Techniques for performing association with leakage-based metrics in a wireless network are described. Association may be performed to select a serving node (e.g., a base station or a relay) for a station (e.g., a UE or a relay). In one design, at least one metric may be determined for at least one candidate node for possible association by the station. A metric for each candidate node may be determined based on leakage of the candidate node. The leakage of the candidate node may include interference due to the candidate node at stations not served by the candidate node (excluding the station). The metric for each candidate node may include a signal-to-leakage ratio (SLR), a geometry-to-leakage ratio (GLR), or a throughput-to-leakage ratio (TLR). A serving node for the station may be selected from among the at least one candidate node based on the at least one metric.

30 Claims, 5 Drawing Sheets

ASSOCIATION WITH LEAKAGE-BASED METRICS IN A WIRELESS NETWORK

The present application claims priority to provisional U.S. Application Ser. No. 61/161,655, entitled "LEAKAGE-BASED ASSOCIATION RULES IN HETEROGENEOUS NETWORKS," filed Mar. 19, 2009, assigned to the assignee hereof and incorporated herein by reference.

BACKGROUND

I. Field

The present disclosure relates generally to communication, and more specifically to techniques for supporting wireless communication.

II. Background

Wireless communication networks are widely deployed to provide various communication content such as voice, video, packet data, messaging, broadcast, etc. These wireless networks may be multiple-access networks capable of supporting multiple users by sharing the available network resources. Examples of such multiple-access networks include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations that can support communication for a number of user equipments (UEs). A UE may communicate with a base station via the downlink and uplink. The downlink (or forward link) refers to the communication link from the base station to the UE, and the uplink (or reverse link) refers to the communication link from the UE to the base station.

A UE may be located within the coverage of one or more base stations. A base station may be selected to serve the UE on the downlink and/or uplink. The process of selecting a serving base station for a UE may be referred to as association, server selection, etc. It may be desirable to select a suitable serving base station for the UE so that good performance can be achieved.

SUMMARY

Techniques for performing association with leakage-based metrics in a wireless network are described herein. Association may be performed to select a serving node for a station. A node may be a base station or a relay, and a station may be a UE or a relay. In one design, at least one metric may be determined for at least one candidate node for possible association by the station. A metric for each candidate node may be determined based on leakage of the candidate node. The leakage of the candidate node may comprise interference due to the candidate node at stations not served by the candidate node (excluding the station) and may be computed in various manners, as described below. The metric for each candidate node may comprise a signal-to-leakage ratio (SLR), a geometry-to-leakage ratio (GLR), or a throughput-to-leakage ratio (TLR), which may be computed as described below. A serving node for the station may be selected from among the at least one candidate node based on the at least one metric.

In one design, resource partitioning may be performed to allocate available resources to a set of nodes. The resource partitioning may take into consideration the serving node selected for the station and may allocate a set of resources to the serving node. At least one resource may be assigned to the station by the serving node and may be taken from the set of resources allocated to the serving node. The station and the serving node may communicate on the at least one resource.

Various aspects and features of the disclosure are described in further detail below.

DETAILED DESCRIPTION

The techniques described herein may be used for various wireless communication networks such as CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM®, etc. UTRA and E-UTRA are part of Universal Mobile Telecommunication System (UMTS). 3GPP Long Term Evolution (LTE) and LTE-Advanced (LTE-A) are new releases of UMTS that use E-UTRA, which employs OFDMA on the downlink and SC-FDMA on the uplink. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies.

Figure 1:
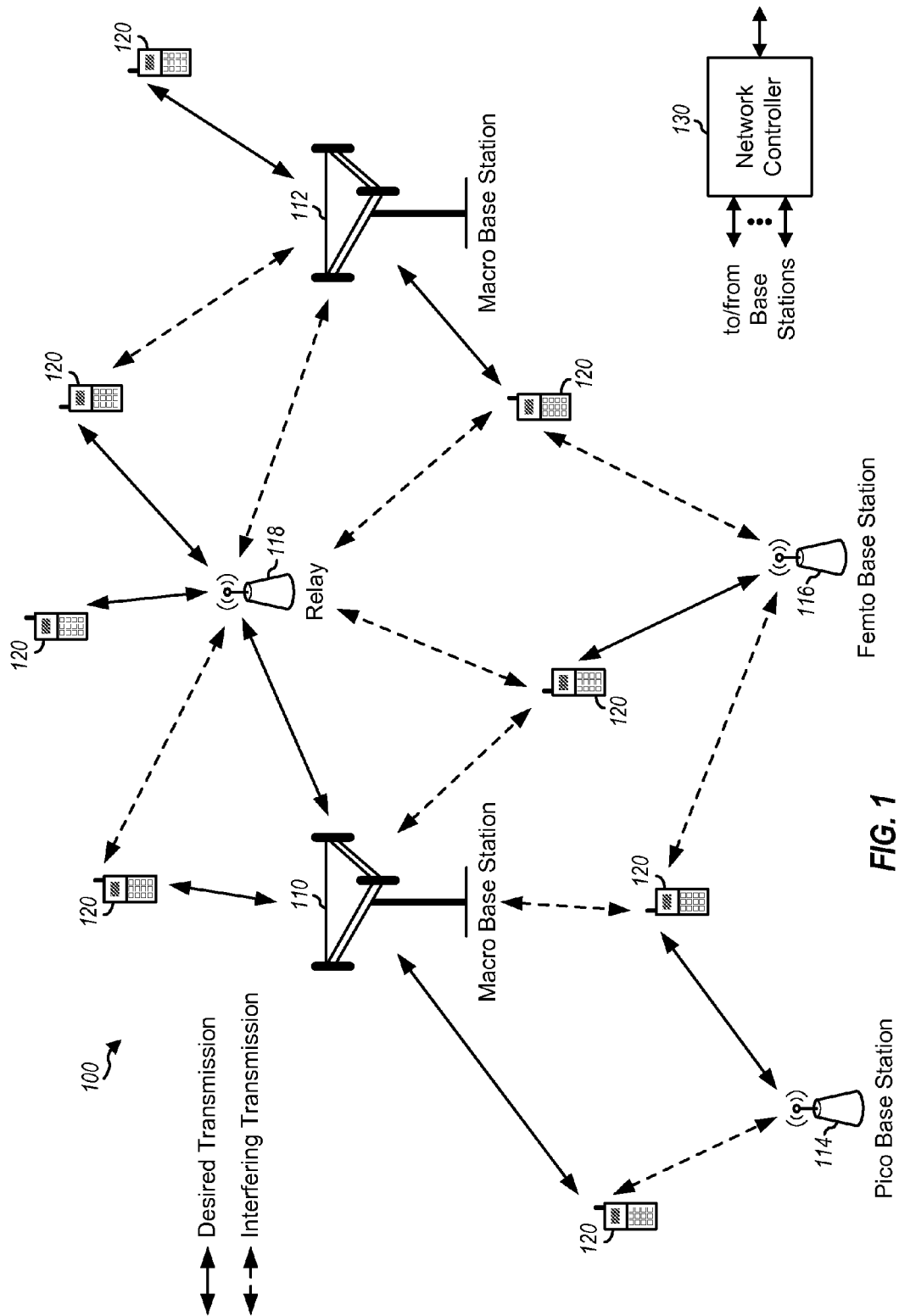
FIG. 1 shows a wireless communication network.

FIG. 1 shows a wireless communication network 100, which may include a number of base stations and other network entities. A base station may be an entity that communicates with UEs and relays and may also be referred to as a node, a Node B, an evolved Node B (eNB), an access point, etc. Each base station may provide communication coverage for a particular geographic area. In 3GPP, the term "cell" can refer to a coverage area of a base station and/or a base station subsystem serving this coverage area, depending on the context in which the term is used. In 3GPP2, the term "sector" or "cell-sector" can refer to a coverage area of a base station and/or a base station subsystem serving this coverage area. For clarity, 3GPP concept of "cell" is used in the description herein.

A base station may provide communication coverage for a macro cell, a pico cell, a femto cell, and/or other types of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a Closed Subscriber Group (CSG)). In the example shown in FIG. 1, wireless network 100 includes macro base stations 110 and 112 for macro cells, a pico base station 114 for a pico cell, and a femto/home base station 116 for a femto cell.

Wireless network 100 may also include relays, e.g., a relay 118. A relay may be an entity that receives a transmission of data from an upstream entity (e.g., a base station or a UE) and sends a transmission of the data to a downstream entity (e.g., a UE or a base station). A relay may also be a UE that relays transmissions for other UEs. A relay may also be referred to as a node, a station, a relay station, a relay base station, a relay node, etc.

Wireless network 100 may be a heterogeneous network that includes base stations of different types, e.g., macro base stations, pico base stations, femto base stations, relays, etc. These different types of base stations may have different transmit power levels, different coverage areas, and different impact on interference in wireless network 100. For example, macro base stations may have a high transmit power level (e.g., 20 Watts or 43 dBm), pico base stations and relays may have a lower transmit power level (e.g., 2 Watts or 33 dBm), and femto base stations may have a low transmit power level (e.g., 0.2 Watts or 23 dBm). Different types of base stations may belong in different power classes having different maximum transmit power levels.

A network controller 130 may couple to a set of base stations and may provide coordination and control for these base stations. Network controller 130 may communicate with base stations via a backhaul. The base stations may also communicate with one another via the backhaul.

UEs 120 may be dispersed throughout wireless network 100, and each UE may be stationary or mobile. A UE may also be referred to as a station, a terminal, a mobile station, a subscriber unit, etc. A UE may be a cellular phone, a personal digital assistant (PDA), a wireless modem, a wireless communication device, a handheld device, a laptop computer, a cordless phone, a wireless local loop (WLL) station, etc. A UE may be able to communicate with base stations, relays, other UEs, etc.

In the description herein, a node may be a base station or a relay. A base station may be a macro base station, a pico base station, a femto base station, etc. A node serving a relay is referred to as a serving node of the relay. A node serving a UE is referred to as a serving node of the UE. A station is an entity that communicates with a node. A station may be a UE or a relay. In one scenario, a station may be a UE, and a node may be a base station or a relay. In another scenario, a station may be a relay, and a node may be a base station.

A station (e.g., a UE or a relay) may be located within the coverage of one or more nodes. A serving node may be selected for the station based on a metric such as maximum geometry/signal strength, minimum pathloss, maximum energy/interference efficiency, maximum user throughput, etc. Geometry relates to received signal quality, which may be quantified by a carrier-over-thermal (CoT), a signal-to-noise ratio (SNR), a signal-to-noise-and-interference ratio (SINR), a carrier-to-interference ratio (C/I), etc. Maximizing energy/interference efficiency may entail (i) minimizing a required transmit energy per bit or (ii) minimizing a received interference energy per unit of received useful signal energy. Part (ii) may correspond to maximizing the ratio of channel gain for an intended node to a sum of channel gains for all interfered nodes. Maximizing user throughput may take into account various factors such as the loading of a node (e.g., the number of stations currently served by the node), the amount of resources allocated to the node, the available backhaul capacity of the node, etc.

Different types of metrics for server selection described above may provide better performance in different scenarios. For example, maximizing geometry may provide good performance on the downlink in many cases, assuming no limitations due to loading or resource partitioning. Minimizing pathloss may provide good performance in a heterogeneous network due to cell splitting gains. Maximizing energy/interference efficiency may often coincide with minimizing pathloss and may provide better performance in some cases. Maximizing user throughput may be better than maximizing energy/interference efficiency in many cases and may be based on current cell loading and resource partitioning.

Association may be performed for a station when it is first powered on and may be referred to as initial association. Association may also be performed to select a new serving node for handover of the station.

Association may be challenging in a heterogeneous network for several reason. First, nodes with different transmit power levels (e.g., macro, pico, and femto base stations/nodes) may create link imbalance scenarios in the heterogeneous network. The relative strengths of downlink signals from different nodes at a station may be dependent on the transmit power levels of the downlink signals as well as the pathloss observed by each downlink signal. The relative strengths of an uplink signal from the station at different nodes may be dependent on only pathloss, since the same uplink signal is measured by these nodes. The strongest node on the downlink may not be the strongest node on the uplink. For example, the station may have higher signal strength for a macro node than a pico node, even though the pico node has lower pathloss, due to the higher transmit power level of the macro node. The pico node would have higher signal strength for the station than the macro node due to the lower pathloss. The macro node may then be the strongest node on the downlink whereas the pico node may be the strongest node on the uplink. Connecting to the strongest node on one link may result in a dominant interference scenario on the other link. For example, if the strongest node on the downlink is selected, then the station may communicate with the macro node on the downlink and may cause high interference to the pico node on the uplink. Conversely, if the strongest node on the uplink is selected, then the macro node may cause high interference to the station on the downlink.

Second, femto nodes with restricted association may impact association by stations/UEs. A femto node may restrict access to only a set of authorized stations. An authorized station may connect to either the femto node or a macro node based on signal strengths. An unauthorized station may not be able to connect to the femto node regardless of signal strength. Restricted association may result in dominant interference scenarios. On the downlink, a femto node may cause high interference to an unauthorized station communicating with a macro node. On the uplink, the unauthorized station may cause high interference to the femto node.

Third, different nodes in the heterogeneous network may have different backhaul capacities, which may impact association. Macro nodes may have dedicated high capacity backhaul links, femto nodes may have shared Internet links through Internet service providers (ISPs), and relays may have over-the-air backhaul links. Association based on maximizing the capacity of the access link between nodes and stations may not be useful if the backhaul capacity is a bottleneck. Relays may split their available resources between the access link and the backhaul link, which may place further restrictions on the available resources for the access link at the relays.

There may be other potential issues with association in the heterogeneous network. These various potential issues with association may be addressed as described below.

In an aspect, association may be performed using metrics defined based on leakage. A leakage-based metric may take into account the channel conditions between a station and a candidate node as well as leakage. Leakage may be defined as interference caused by a node to other stations when serving a particular station. In contrast, received signal quality (e.g., CoT or SNR) is a ratio of a desired signal for a station over interference observed by that station. Leakage is thus different from interference observed by a station.

To select a serving node for a given station t, a metric may be computed for station t for each candidate node that might serve station t. An active set may be maintained for station t and may include nodes with sufficiently high received signal quality or strength at station t. The candidate nodes may be nodes in the active set of station t. The candidate node with the best metric may be selected to serve station t.

The wireless network may support a set of resources for each of the downlink and uplink. The available resources may be defined based on time, or frequency, or both time and frequency, or some other criteria. For example, the available resources may correspond to different frequency subbands, or different time interlaces, or different time-frequency blocks, etc. A time interlace may include evenly spaced time slots, e.g., every S-th time slot, where S may be any integer value. The available resources may be defined for the entire wireless network.

In a first design, leakage of a candidate node p if selected to serve station t may be expressed as:

$$L_1(p, t) = PSD_{nom}(p) \cdot \sum_{i \in IS(p,t)} G(p, i), \quad \text{Eq (1)}$$

where $PSD_{nom}(p)$ is a nominal transmit power spectral density (PSD) of node p, $G(p,i)$ is a channel gain between node p and another station i, $IS(p,t)$ is an interference set of other stations to consider in computing leakage, and $L_1(p,t)$ is the leakage of node p if serving station t, for the first design.

In the first design shown in equation (1), leakage may be computed as the sum of interference caused by candidate node p to stations in the interference set. Equation (1) assumes that candidate node p transmits at the nominal transmit PSD on all resources, which may correspond to the maximum transmit power of node p. The interference observed at each station is equal to the transmit PSD of node p times the channel gain between node p and that station. $PSD_{nom}(p)$ may be moved outside of the summation, as shown in equation (1), since it is the same for all stations. The design in equation (1) may over-estimate both transmitted and received interference and may have a bias toward low power nodes.

An interference set may include stations used to compute leakage and may be defined in various manners. In one design, an interference set may include stations not currently served by candidate node p (excluding station t). In this design, the interference set may be expressed as $IS(p,t)=\{i \neq t, S(i) \neq p\}$, where $S(i)$ denotes a serving node for station i.

In another design, an interference set may include stations not served by candidate node p as well as stations currently served by node p (excluding station t). In this design, the interference set may be expressed as $IS(p,t)=\{i \neq t\}$. Leakage would then include (i) interference caused by candidate node p to other stations not served by node p and (ii) signal power received from node p at other stations served by node p. Part (ii) may include the signal power intended for station t and, for other stations served by node p, part (ii) may neither be desired signal nor interference. Nevertheless, part (ii) may be used as interference in the computation of leakage, e.g., to account for loss of bandwidth or backhaul rate that the currently served stations may experience if station t is handed over to node p and is assigned some resources that are assigned to the currently served stations. This design may provide better performance when the backhaul capacity of candidate node p is limited.

In yet another design, an interference set may include stations not served by candidate node p but have node p in their active sets (excluding station t). An active set may be maintained for each station and may include nodes with sufficient received signal quality or strength at the station. In this design, the interference set may be expressed as $IS(p,t)=\{i \neq t, S(i) \neq p, p \in AS(i)\}$, where $AS(i)$ denotes the active set of station i.

In yet another design, an interference set may include stations that have candidate node p in their active sets (excluding station t). In this design, the interference set may be expressed as $IS(p,t)=\{i \neq t, p \in AS(i)\}$. An interference set may also be defined in other manners.

The first design in equation (1) assumes that candidate node p uses the nominal transmit PSD on all resources, which may simplify computation of leakage. Leakage may be more accurately computed by taking into account the actual transmit PSD of node p on each resource.

In a second design, the leakage of candidate node p if selected to serve station t may be expressed as:

$$L_2(p, t) = PSD_{avg}(p) \cdot \sum_{i \in IS(p,t)} G(p, i), \text{ and} \quad \text{Eq (2)}$$

$$PSD_{avg}(p) = \frac{1}{BW} \cdot \sum_r PSD(p, r) \cdot W(r), \quad \text{Eq (3)}$$

where $PSD(p,r)$ is a transmit PSD of candidate node p on resource r, $PSD_{avg}(p)$ is an average transmit PSD of candidate node p over all resources, $W(r)$ is the bandwidth of resource r, BW is the system bandwidth, and $L_2(p,t)$ is the leakage of node p if serving station t, for the second design.

In the second design shown in equation (2), leakage may be computed based on the average transmit PSD (instead of the nominal transmit PSD) of candidate node p. The average transmit PSD of candidate node p over all resources may be computed based on the transmit PSD used by node p on each resource, as shown in equation (3). Equation (2) assumes that each station observes the average transmit PSD from candidate node p. The design in equation (2) may be more accurate than the design in equation (1) in terms of transmitted interference but may still over-estimate the received interference.

The designs in equations (1) and (2) assume that each station in the interference set observes interference from candidate node p on all resources. Leakage may be more accurately computed by determining resources on which each station i might be scheduled and estimating interference on these resources. In one design, each station i may be assumed to be assigned a fraction of each available resource. This fraction may be denoted as $\alpha(i,r)$ and may be viewed as the fraction of time during which resource r is assigned to station i.

In a third design, the leakage of candidate node p if selected to serve station t may be expressed as:

$$L_3(p, t) = \frac{1}{BW} \sum_{i \in IS(p,t)} \sum_r PSD(p, r) \cdot W(r) \cdot G(p, i) \cdot \alpha(i, r), \quad \text{Eq (4)}$$

where $L_3(p,t)$ is the leakage of node p if serving station t, for the third design.

In the third design shown in equation (4), the interference observed on each resource r by station i may be estimated based on the transmit PSD of candidate node p on resource r, the bandwidth of resource r, the channel gain between node p and station i, and the fraction of time in which station i is assigned resource r. The interference observed by station i on all resources may be summed to obtain the total interference observed by station i. The interference observed by all stations in the interference set may then be summed to obtain leakage. The design in equation (4) may be more accurate than the designs in equations (1) and (2) in terms of both transmitted and received interference.

The third design in equation (4) takes into account the allocation of resources to candidate node p (e.g., the transmit PSD levels) and the assignment of resources to stations in the interference set (e.g., the $\alpha(i,r)$ values). Assignment information may be available at the serving nodes of these stations. In one design, each node may provide assignment information for its served stations to neighbor nodes to allow the neighbor nodes to compute leakage. In another design, each node may compute intermediate quantities based on the assignment information for its served stations and may send these quantities to the neighbor nodes to allow the neighbor nodes to compute leakage.

Equations (1), (2) and (4) show three designs of computing leakage. Leakage computed in equation (4) may be more accurate than leakage computed in equation (2), which may be more accurate than leakage computed in equation (1). However, progressively more detailed information may be needed to compute progressively more accurate leakage. Leakage may also be computed in other manners. For example, leakage may be more accurately computed by using a channel gain $G(p,i,r)$ for each resource r instead of a common channel gain $G(p,i)$ for all resources. As another example, resources to be allocated to station t if it is handed over to candidate node p may be accounted for in other manners instead of with the signal power of stations currently served by node p being included in leakage.

In general, the leakage of candidate node p if selected to serve station t may be expressed as:

$$L(p, t) = \sum_{i \in IS(p,t)} I(p, i), \quad \text{Eq (5)}$$

where $I(p,i)$ is the interference observed by station i from candidate node p, and $L(p,t)$ is the leakage of node p if serving station t.

In equation (5), the interference observed by each station i from candidate node p may be computed as shown in equation (1), (2), or (4), or in some other manner. The leakage $L(p,t)$ in equation (5) may be equal to $L_1(p,t)$ in equation (1), $L_2(p,t)$ in equation (2), $L_3(p,t)$ in equation (4), or leakage computed in other manners.

Various types of metrics may be defined based on leakage and used for association. In a first design, association may be performed by selecting a node with a maximum signal-to-leakage ratio (SLR), which may be expressed as:

$$SLR(p, t) = \frac{PSD_{nom}(p) \cdot G(p, t)}{N_0 + L(p, t)}, \quad \text{Eq (6)}$$

where $G(p,t)$ is the channel gain between candidate node p and station t, $N_0$ is ambient interference and thermal noise observed by station t, and $SLR(p,t)$ is the SLR of station t for candidate node p.

In equation (6), the numerator includes the desired signal from candidate node p at station t, and the denominator includes leakage of candidate node p for station t as well as $N_0$ at station t. The desired signal may be computed by using (i) the nominal transmit PSD for candidate node p on all resources, as shown in equation (6), or (ii) the average transmit PSD for candidate node p. $N_0$ may be measured/estimated by station t and included in the computation of SLR, or may be reported by station t to the wireless network (e.g., the current serving node), or may be ignored (e.g., when the computation is done by candidate node p).

In another design, association may be performed by selecting a node with a maximum geometry-to-leakage ratio (GLR), which may be expressed as:

$$GLR(p, t) = \frac{\text{Geometry}(p, t)}{N_0 + L(p, t)}, \text{ and} \quad \text{Eq (7)}$$

$$\text{Geometry}(p, t) + \frac{PSD_{nom}(p) \cdot G(p, t)}{N_0 + \sum_{q \neq p} PSD_{nom}(q) \cdot G(q, t)}, \quad \text{Eq (8)}$$

where

Geometry(p,t) is the geometry of station t for candidate node p, $G(q,t)$ is the channel gain between neighbor node q and station t, and $GLR(p,t)$ is the GLR of station t for candidate node p.

In equation (7) for GLR, the numerator includes the geometry of station t for candidate node p, and the denominator includes leakage of candidate node p for station t as well as $N_0$ at station t. In equation (8) for geometry, the numerator includes the desired signal from candidate node p at station t, and the denominator includes the total interference from other nodes as well as $N_0$. The desired signal from candidate node p and the interference from other nodes may be computed using (i) the nominal transmit PSD for each node, as shown in equation (8), or (ii) the average transmit PSD for each node. The nominal or average transmit PSD for nodes p and other nodes may be known or sent via the backhaul and/or over the air. The channel gains for nodes p and other nodes may be obtained based on pilot measurements from station t.

In yet another design, association may be performed by selecting a node with a maximum throughput-to-leakage ratio (TLR), which may be expressed as:

$$TLR(p, t) = \frac{TP(p, t)}{N_0 + L(p, t)}, \quad \text{Eq (9)}$$

where

TP(p,t) is an estimated throughput of station t for candidate node p, and

TLR(p,t) is the TLR of station t for candidate node p.

In equation (9), the numerator includes the throughput or rate of station t for candidate node p, and the denominator includes leakage of candidate node p for station t as well as $N_0$ at station t. The throughput of station t for candidate node p may be estimated in various manners.

In one design, the throughput of station t may be estimated based on geometry, as follows:

$$TP_1(p, t) = \frac{\min\{BW \cdot C(\text{Geometry}(p, t)), R_{BH}(p)\}}{N(p) + 1}, \quad \text{Eq (10)}$$

where $TP_1(p,t)$ is the throughput of station t for candidate node p, $R_{BH}(p)$ is the backhaul capacity of candidate node p, N(p) is the number of stations currently served by candidate node p, and C( ) denotes a capacity function.

In equation (10), an overall throughput may be determined by (i) converting geometry for station t to spectral efficiency based on a capacity function and (ii) multiplying the spectral efficiency by the system bandwidth. The overall throughput may be limited by the backhaul capacity of candidate node p via the minimum function. The throughput $TP_1(p,t)$ may then be obtained by dividing the overall throughput by the number of stations currently served by node p plus one to account for station t being handed over to node p. Equation (10) assumes that station t will be assigned the same fraction of the available resource as other stations currently served by node p.

In another design, the throughput of station t may be estimated as follows:

$$TP_2(p, t) = \frac{\min\left\{\sum_r \alpha(t, r) \cdot SE(p, t, r) \cdot W(r), R_{BH}(p)\right\}}{N(p) + 1}, \quad \text{Eq (11)}$$

where SE(p,t,r) is a spectral efficiency of station t on resource r for candidate node p, α(t,r) is an assignment of resource r to station t, with $0 \leq \alpha(t,r) \leq 1$, and $TP_2(p,t)$ is the throughput of station t on all resources for candidate node p.

In equation (11), an overall throughput may be determined based on the spectral efficiency of station t on each resource r, the fraction of time in which station t is assigned resource r, and the bandwidth of resource r. The overall throughput may be limited by the backhaul capacity of candidate node p. The throughput $TP_2(p, t)$ may then be obtained by dividing the overall throughput by the number of stations currently served by node p plus one to account for station t being handed over to node p.

The spectral efficiency of station t on resource r for candidate node p may be estimated as follows:

$$SE(p, t, r) = C\left(\frac{PSD(p, r) \cdot G(p, t)}{N_0 + \sum_{q \neq p} PSD(q, r) \cdot G(q, t)}\right), \quad \text{Eq (12)}$$

where PSD(q,r) is the transmit PSD of neighbor node q on resource r.

As shown in equations (10) and (11), the throughput of station t may be estimated by taking into account the backhaul capacity of candidate node p as well as the number of stations currently served by node p. As shown in equations (11) and (12), the throughput of station t may also take into account the allocation of resources to candidate node p and other nodes (e.g., the transmit PSD levels) and the assignment of resources to station t (e.g., the α(t,r) values). The throughput of station t may also be estimated in other manners.

Equations (6), (7) and (9) show three exemplary types of metrics SLR, GLR and TLR defined based on leakage. These three types of metrics are progressively more precise but require progressively more detailed information to compute. In general, a metric may be defined based on leakage computed using any of the designs described above. For example, different TLR metrics may be defined based on throughput computed as shown in equation (11) and leakage computed in different manners. A first TLR may be defined based on leakage computed as shown in equation (1). A second TLR may be defined based on leakage computed as shown in equation (2). A third TLR may be defined based on leakage computed as shown in equation (4).

The level of precision of a metric may be matched to the level of precision of leakage. For example, leakage computed based on the first design may be used to compute SLR, GLR or TLR with throughput computed as shown in equation (10), which do not require information for each resource, e.g., PSD(p, r). Leakage computed based on the second or third design may be used to compute TLR with throughput computed as shown in equations (11) and (12), which require information for each resource, e.g., PSD(p,r). Other types of metrics may also be defined based on leakage.

In one design, station t (e.g., a UE or a relay) may perform association when station t is first powered on, or when a new serving node is to be selected for station t for handover. Station t may obtain pertinent information for candidate nodes and may compute leakage-based metrics for the candidate nodes based on the obtained information. Station t may then select the candidate node with the best metric as a serving node.

Figure 2:
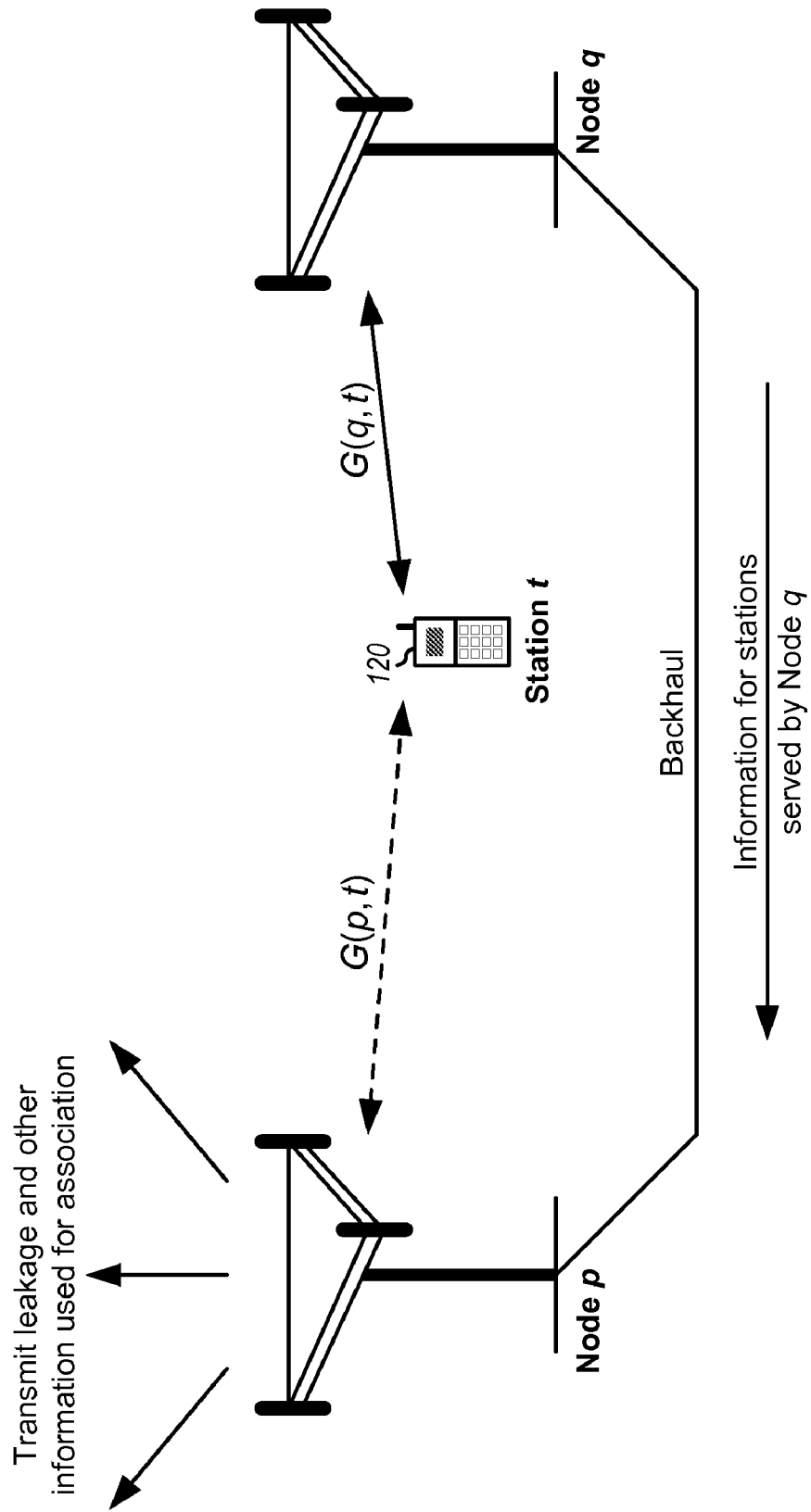
FIG. 2 shows association using leakage-based metrics.

FIG. 2 shows exemplary exchange of information to support association using leakage-based metrics. For simplicity, FIG. 2 shows only two nodes p and q and one station t. In general, any number of nodes may be present in the wireless network, and each node may serve any number of stations.

Each node may obtain information for stations served by that node. The information for each station may include the active set of the station, the channel gain between the node and the station, etc. Each node may exchange information with its neighbor nodes. For example, each node may send information conveying the set of stations currently served by that node as well as the active set, channel gain, and assigned resources for each station. Each node may determine leakage based on the information obtained by that node as well as information received from the neighbor nodes.

In one design, each node may transmit (e.g., broadcast) pertinent information that may be used by stations to compute leakage-based metrics for association. For example, each node may broadcast one or more of the following:

1. Nominal or average transmit PSD of the node,
2. Leakage of the node,
3. Backhaul capacity of the node, and
4. Number of stations currently served by the node.

Each node may also broadcast other information that may be used for association.

Node p may compute leakage based on information exchanged with neighbor nodes. For example, node p may identify other stations not served by node p based on the active sets of these stations. Node p may obtain information on the active sets and channel gains of the other stations from the neighbor nodes via the backhaul.

As an example, node p may serve three stations (not shown in FIG. 2), with station 1 having an active set of AS(1)={p, q, u, v}, station 2 having an active set of AS(2)={p, u, v}, and station 3 having an active set of AS(3)={p, q, v}. Node p may form three other station (OS) sets for three neighbor nodes (not shown in FIG. 2). The OS set for neighbor node q may include stations 1 and 3, the OS set for neighbor node u may include stations 1 and 2, and the OS set for neighbor node v may include stations 1, 2 and 3. Node p may send these three OS sets as well as the channel gains for the stations in these OS sets to neighbor nodes q, u and v. Node p may also receive three OS sets generated by neighbor nodes q, u and v for node p as well as the channel gain for each station in these OS sets. Node p may form an interference set IS(p) based on the union of the three received OS sets. The interference set would include stations having node p in their active set but are not served by node p. Node p may compute leakage L(p) based on the stations in the interference set and their channel gains, e.g., as shown in equation (1) or (2). If each node sends assignment information for its served stations (e.g., the α(t,r) values) and information for its allocated resources (e.g., the transmit PSD levels), then node p may compute leakage L(p) based further on the additional information, e.g., as shown in equation (4). Alternatively, node p may receive partial leakage quantities from each neighbor node q (e.g., leakage caused by node q to stations served by node p) and may compute an overall leakage based on the quantities received from all neighbor nodes. Node p may broadcast its leakage L(p) over the air to stations.

Station t may be served by node q and may evaluate different candidate nodes for possible handover. Station t may receive leakage broadcast by each candidate node. Station t may remove its contribution from the leakage L(p) received from candidate node p, as follows:

$$L(p,t)=L(p)-I(p,t),\qquad\text{Eq (13)}$$

where I(p,t) is the interference observed by station t from candidate node p. Station t may compute the interference I(p,t) using the nominal or average transmit PSD of node p and the channel gain between station t and node p.

Station t may also compute a leakage-based metric for each candidate node p based on the computed leakage L(p, t) and other information obtained for node p. Station t may select a new serving node based on the metrics computed for all candidate nodes.

In another design, a given node p (e.g., a base station or a relay) may perform association to select a new serving node for station t currently served by node q. Node p may obtain pertinent information for candidate nodes (e.g., via the backhaul) and may compute leakage-based metrics for the candidate nodes for station t based on the obtained information. Node p may select the candidate node with the best metric as a new serving node for station t.

The leakage-based metrics described herein may provide better performance over other metrics normally used for association. The other metrics are typically defined based on quantities (e.g., geometry, pathloss, or throughput) related to a station for which a serving node is to be selected. In contrast, the leakage-based metrics include leakage or interference caused to other stations. Leakage may thus be used to quantify the cost associated with selecting a given node as a serving node for a station. Taking this cost into account for association may result in selection of a more suitable serving node for the station.

In another aspect, association using leakage-based metrics may be performed in conjunction with resource partitioning to allocate available resources to nodes and possibly to the access link and backhaul link of relays. Association may be performed to determine a set of stations served by each node. Resource partitioning may then be performed to allocate the available resources to a set of nodes and possibly between the access and backhaul links of relays. Resource partitioning may thus take into account the result of association using leakage-based metrics.

In one design, an adaptive algorithm may be used for resource partitioning. The algorithm is adaptive in that it can take into consideration the current operating scenario, which may be different for different parts of the wireless network and may also change over time. The adaptive algorithm may be performed by each node in a distributed manner and may attempt to maximize the utility function over a set of nodes or possibly across the entire wireless network.

Figure 3:
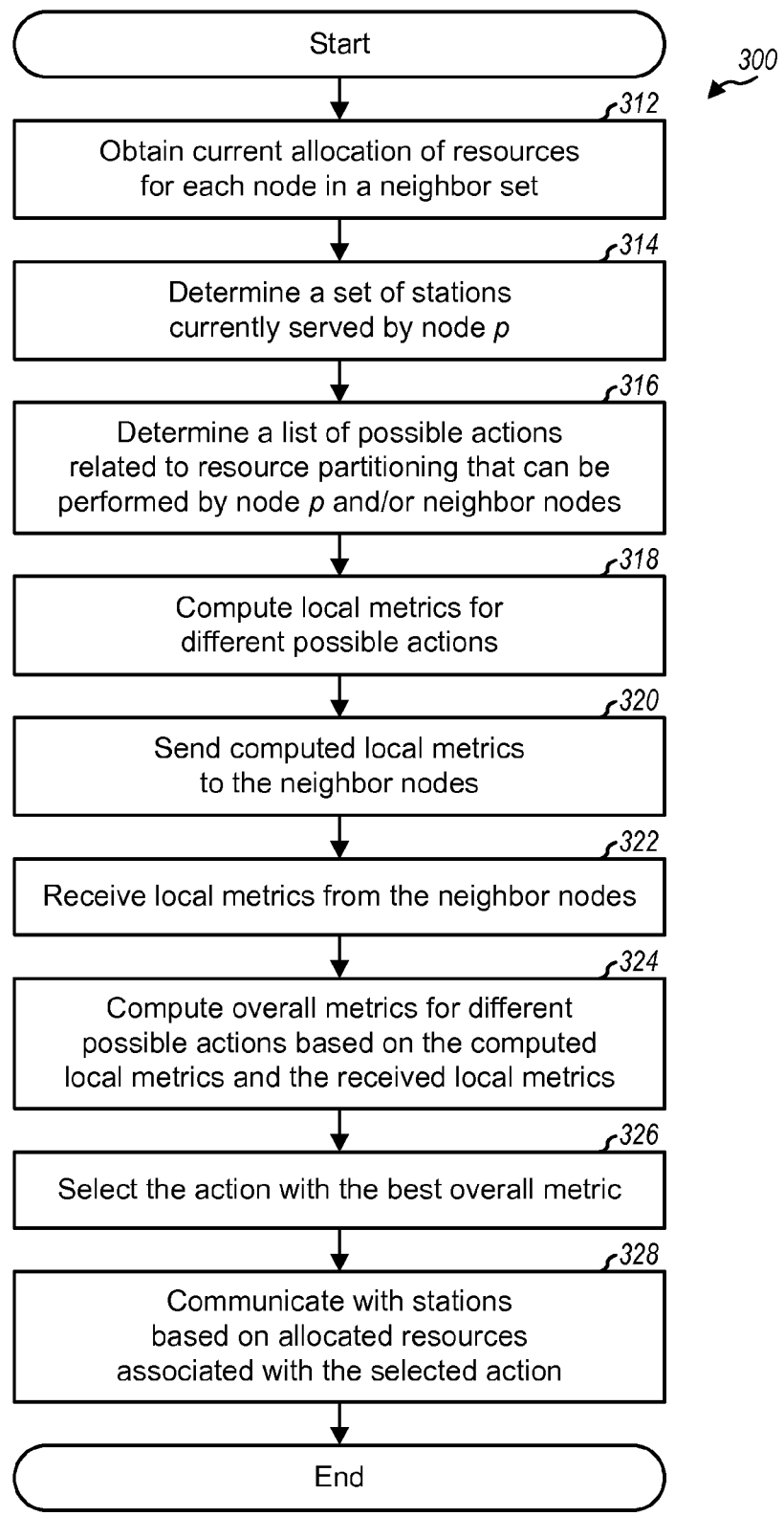
FIG. 3 shows a process for performing resource partitioning.

FIG. 3 shows a design of a process 300 for performing resource partitioning. Process 300 may be performed by each node in a set of nodes (a neighbor set) for a distributed design. The neighbor set may include nodes corresponding to base stations and may also include nodes corresponding to relays. For clarity, process 300 is described below for node p, which may be a base station or a relay.

Node p may obtain the current allocation of resources for each node in the neighbor set, e.g., via the backhaul or through other means (step 312). For the downlink, the allocated resources for a node may be defined by a list of transmit PSD levels for the available resources, one transmit PSD level for each available resource. The transmit PSD level for each resource may indicate an allowed transmit PSD for the node on the resource. Node p may determine a set of stations currently served by node p (step 314).

Node p may determine a list of possible actions related to resource partitioning that can be performed by node p and/or neighbor nodes (step 316). A possible action for resource partitioning may cover a specific allocation of resources for node p as well as a specific allocation of resources for each neighbor node in the neighbor set. A possible action may entail node p changing its transmit PSD on a particular resource and/or a neighbor node changing its transmit PSD on the resource. Different possible actions may also be defined for different partitioning of resources between the access and backhaul links of one or more relays.

Node p may compute local metrics for different possible actions (block 318). For example, a local metric may indicate an overall rate achieved by node p for a particular action a and may be computed as follows:

$$U(p, a) = \sum_{S(t)=p} R(p, t, a),\qquad\text{Eq (14)}$$

where

R(p,t,a) is the rate achieved by station t for node p for action a, and

U(p,a) is a local metric for node p for action a.

The rate R(p,t,a) for each station may be computed as shown by the summation in the numerator of equation (11). In general, the local metric for node p for each possible action may be dependent on a utility function, which may be defined based on the sum of user rates, the minimum of user rates, the sum of log of user rates, or some other function of rate, latency, queue size, etc.

The local metrics for different possible actions may be used by node p as well as the neighbor nodes to compute overall metrics for different possible actions. Node p may send its computed local metrics U(p,a), for a∈A, to the neighbor nodes, where A denotes the list of possible actions (block 320). Node p may also receive local metrics U(q,a), for a∈A, from each neighbor node q in the neighbor set (block 322). Node p may compute overall metrics for different possible actions based on its computed local metrics and the received local metrics (block 324). For example, an overall metric may be computed for each possible action a, as follows:

$$V(a) = U(p, a) + \sum_{q \in NS(p) \setminus \{p\}} U(q, a), \quad \text{Eq (15)}$$

where V(a) is an overall metric for possible action a. The summation in equation (15) is over all neighbor nodes in the neighbor set except for node p.

After completing the metric computation, node p may select the action with the best overall metric (block 326). Each neighbor node may similarly compute overall metrics for different possible actions and may also select the action with the best overall metric. Node p and the neighbor nodes should select the same action if they operate on the same set of local metrics. Each node may then operate based on the selected action, without having to communicate with one another regarding the selected action. However, node p and its neighbor nodes may operate on different local metrics and may obtain different best overall metrics. This may be the case, for example, if node p and its neighbor nodes have different neighbor sets. In this case, node p may negotiate with the neighbor nodes to determine which action to take. This may entail exchanging overall metrics for some promising actions between the nodes and selecting the action that can provide good performance for as many nodes as possible.

Regardless of how the best action is selected, the selected action is associated with a specific allocation of resources for node p. Node p may communicate with its stations on the resources allocated to node p by the selected action (block 328). The allocated resources for node p may be defined by a list of transmit PSD levels, one transmit PSD level for each available resource. Node p may use the specified transmit PSD level for each available resource.

For clarity, resource partitioning has been described for the downlink. Resource partitioning may also be performed in similar manner for the uplink. In one design, a set of target interference-over-thermal (IoT) levels may be used for resource partitioning on the uplink in similar manner as the set of PSD levels for the downlink. One target IoT level may be selected for each resource on the uplink, and transmissions from each station on each resource may be controlled so that the actual IoT on that resource at each neighbor node in the active set of the station is at or below the target IoT level for that resource at the neighbor node. A utility function may be defined to quantify performance of data transmission on the uplink and may be any of the functions described above for the downlink, e.g., a function of the sum of user rates. The rate of each station on the uplink may be a function of transmit power, channel gain, target IoT level, etc. Local metrics and overall metrics may be computed for different possible actions based on the utility function. Each possible action may be associated with a list of target IoT levels for all available resources for each node in a neighbor set. The possible action with the best overall metric may be selected for use.

Figures 4, 5:
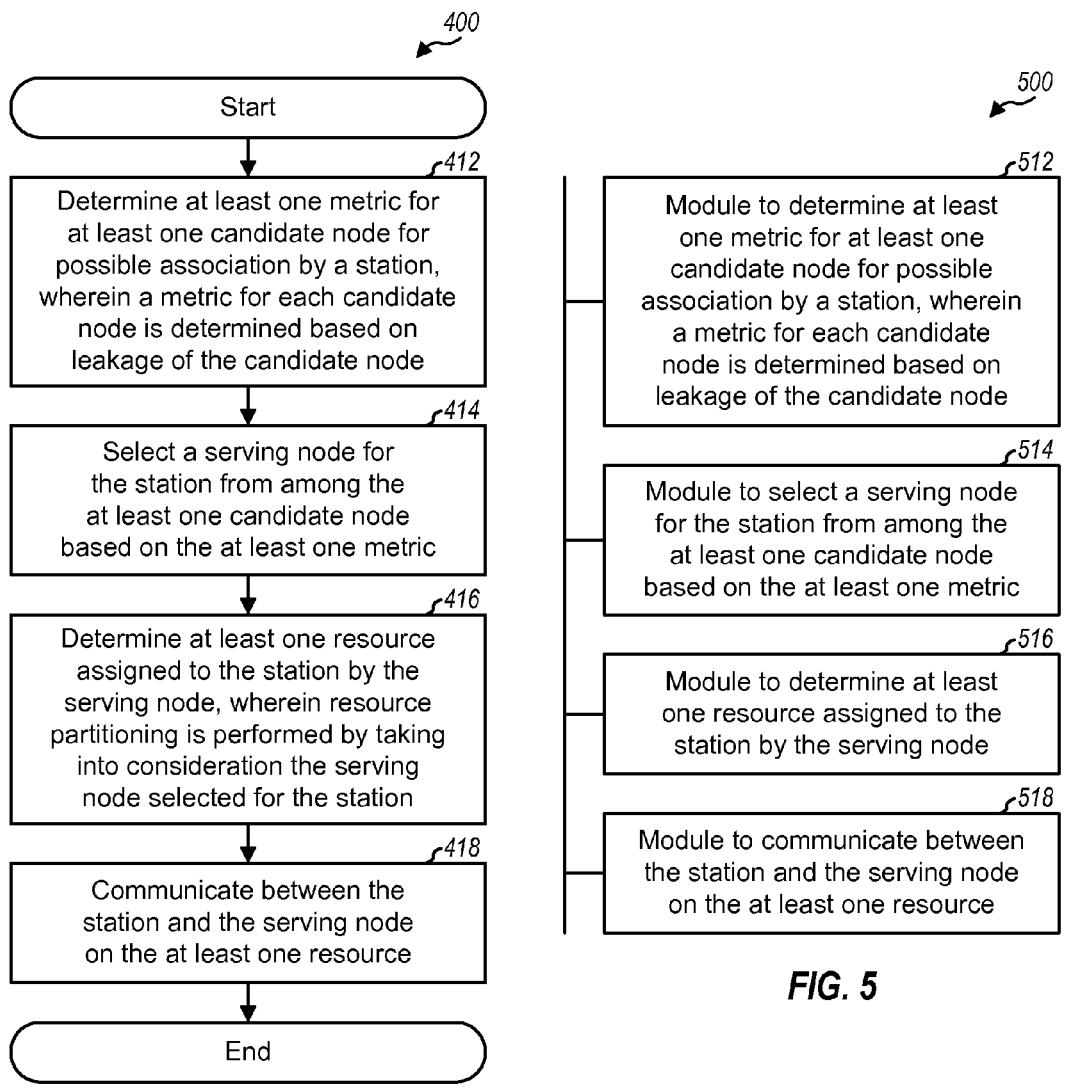
FIG. 4 shows a process for supporting communication.
FIG. 5 shows an apparatus for supporting communication.

FIG. 4 shows a design of a process 400 for supporting communication in a wireless network. Process 400 may be performed by a UE, a relay, a base station, or some other entity. At least one metric may be determined for at least one candidate node for possible association by a station (block 412). A metric for each candidate node may be determined based on leakage of the candidate node. A serving node for the station may be selected from among the at least one candidate node based on the at least one metric (block 414).

The leakage of each candidate node may comprise interference due to the candidate node at stations not served by the candidate node and excluding the station. The leakage of each candidate node may further comprise received signal power for the candidate node at stations served by the candidate node. The leakage of each candidate node may be determined based on a nominal transmit PSD, an average transmit PSD, or a transmit PSD on each resource for the candidate node, e.g., as shown in equation (1), (2), or (4). The leakage of each candidate node may be determined based further on channel gains between the candidate node and the stations not served by the candidate node.

In one design, the metric for each candidate node may comprise an SLR determined based on a desired signal for the candidate node at the station and the leakage of the candidate node, e.g., as shown in equation (6). In another design, the metric for each candidate node may comprise a GLR determined based on geometry achieved by the station for the candidate node and the leakage of the candidate node, e.g., as shown in equation (7). In yet another design, the metric for each candidate node may comprise a TLR determined based on an estimated throughput of the station for the candidate node and the leakage of the candidate node, e.g., as shown in equation (9). In one design, the throughput of the station for the candidate node may be estimated based on geometry achieved by the station for the candidate node, e.g., as shown in equation (10). In another design, the throughput of the station for the candidate node may be estimated based on resources assigned to the station by the candidate node, transmit PSD levels of the candidate node for the assigned resources, and channel gain between the candidate node and the station, e.g., as shown in equations (11) and (12). The throughput of the station for the candidate node may be estimated based further on the backhaul capacity of the candidate node, the number of stations currently served by the candidate node, and/or other information, e.g., as shown in equations (10) and (11).

In one design, blocks 412 and 414 may be performed by the station. In this design, a node may transmit information (e.g., via broadcast, unicast, or backhaul) for use by stations to compute metrics for association. The information may comprise the (nominal or average) transmit PSD of the node, leakage of the node, backhaul capacity of the node, the number of stations currently served by the node, and/or other information. In another design, blocks 412 and 414 may be performed by a current serving node of the station or by a designated entity. In this design, a node may send information via the backhaul to neighbor nodes for use to compute metrics for association. For both designs, the station may comprise a UE, and the at least one candidate node may comprise at least one base station and/or at least one relay. Alternatively, the station may comprise a relay, and the at least one candidate node may comprise at least one base station or at least one relay (e.g., for multi-hop).

At least one resource assigned to the station by the serving node may be determined (block 416). The at least one resource may be from a set of resources allocated to the serving node by resource partitioning. The resource partitioning may take into consideration the serving node selected for the station and may be performed as shown in FIG. 3. Communication between the station and the serving node may occur on the at least one resource (block 418).

FIG. 5 shows a design of an apparatus 500 for supporting communication in a wireless network. Apparatus 500 includes a module 512 to determine at least one metric for at least one candidate node for possible association by a station, wherein a metric for each candidate node is determined based on leakage of the candidate node, a module 514 to select a serving node for the station from among the at least one candidate node based on the at least one metric, a module 516 to determine at least one resource assigned to the station by the serving node, and a module 518 to communicate between the station and the serving node on the at least one resource.

The modules in FIG. 5 may comprise processors, electronic devices, hardware devices, electronic components, logical circuits, memories, software codes, firmware codes, etc., or any combination thereof.

Figure 6:
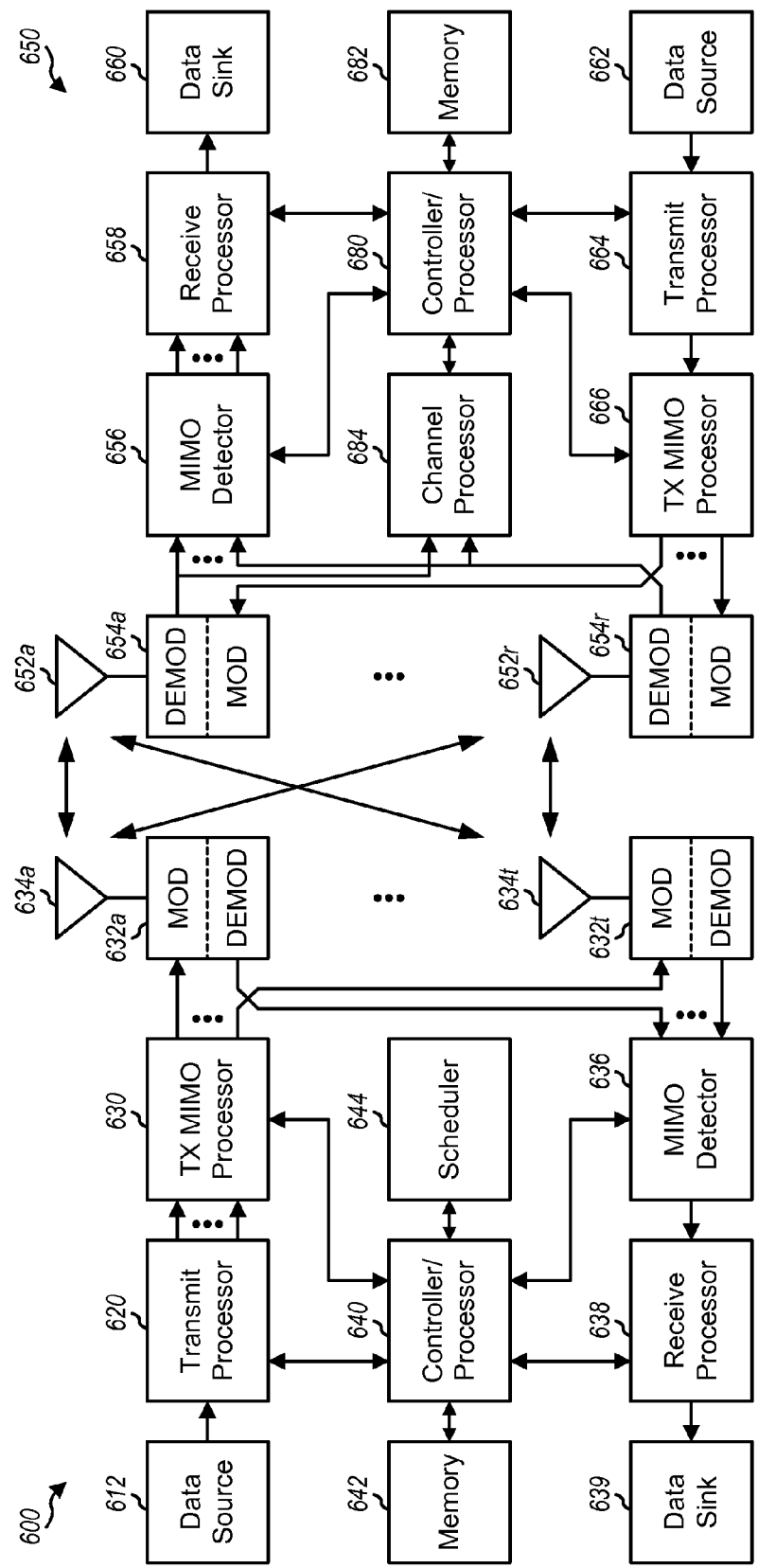
FIG. 6 shows a block diagram of a node and a station.

FIG. 6 shows a block diagram of a design of a node 600 and a station 650. Node 600 may be a base station or a relay. Station 650 may be a relay or a UE. Node 600 may be equipped with T antennas 634a through 634t, and station 650 may be equipped with R antennas 652a through 652r, where in general T≧1 and R≧1.

At node 600, a transmit processor 620 may receive data from a data source 612 for one or more stations and control information from a controller/processor 640. Processor 620 may process (e.g., encode, interleave, and modulate) the data and control information to obtain data symbols and control symbols, respectively. Processor 620 may also generate pilot symbols for pilot or reference signal. A transmit (TX) multiple-input multiple-output (MIMO) processor 630 may perform spatial processing (e.g., precoding) on the data symbols, the control symbols, and/or the pilot symbols, if applicable, and may provide T output symbol streams to T modulators (MODs) 632a through 632t. Each modulator 632 may process a respective output symbol stream (e.g., for OFDM, etc.) to obtain an output sample stream. Each modulator 632 may further process (e.g., convert to analog, amplify, filter, and upconvert) the output sample stream to obtain a downlink signal. T downlink signals from modulators 632a through 632t may be transmitted via T antennas 634a through 634t, respectively.

At station 650, antennas 652a through 652r may receive the downlink signals from node 600 and may provide received signals to demodulators (DEMODs) 654a through 654r, respectively. Each demodulator 654 may condition (e.g., filter, amplify, downconvert, and digitize) its received signal to obtain input samples. Each demodulator 654 may further process the input samples (e.g., for OFDM, etc.) to obtain received symbols. A MIMO detector 656 may obtain received symbols from all R demodulators 654a through 654r, perform MIMO detection on the received symbols if applicable, and provide detected symbols. A receive processor 658 may process (e.g., demodulate, deinterleave, and decode) the detected symbols, provide decoded data for station 650 to a data sink 660, and provide decoded control information to a controller/processor 680.

On the uplink, at station 650, a transmit processor 664 may receive and process data from a data source 662 and control information from controller/processor 680. Processor 664 may also generate pilot symbols for pilot or reference signal. The symbols from transmit processor 664 may be precoded by a TX MIMO processor 666 if applicable, further processed by modulators 654a through 654r (e.g., for SC-FDM, OFDM, etc.), and transmitted to node 600. At node 600, the uplink signals from station 650 may be received by antennas 634, processed by demodulators 632, detected by a MIMO detector 636 if applicable, and further processed by a receive processor 638 to obtain decoded data and control information sent by station 650. Processor 638 may provide the decoded data to a data sink 639 and the decoded control information to controller/processor 640.

Controllers/processors 640 and 680 may direct the operation at node 600 and station 650, respectively. A channel processor 684 may make pilot measurements, which may be used to determine an active set for station 650 and to compute channel gains, throughputs, metrics, etc. Processor 640 and/or other processors and modules at node 600 may perform or direct process 300 in FIG. 3, process 400 in FIG. 4, and/or other processes for the techniques described herein. Processor 680 and/or other processors and modules at station 650 may perform or direct process 400 in FIG. 4 and/or other processes for the techniques described herein. Memories 642 and 682 may store data and program codes for node 600 and station 650, respectively. A scheduler 644 may schedule stations for data transmission on the downlink and/or uplink.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A method for wireless communication, comprising:
   determining at least one metric for at least one candidate node for possible association by a station, wherein a metric for each candidate node is determined based on a leakage of the candidate node and the metric for each candidate node comprises a geometry-to-leakage ratio (GLR) determined based on a geometry, associated with the station, for the candidate node and the leakage of the candidate node; and
   selecting a serving node for the station from among the at least one candidate node based on the at least one metric.

2. The method of claim 1, wherein the leakage of each candidate node comprises interference due to the candidate node at stations not served by the candidate node and excluding the station.

3. The method of claim 2, wherein the leakage of each candidate node further comprises received signal power for the candidate node at stations served by the candidate node.

4. The method of claim 2, wherein the leakage of each candidate node is determined based on channel gains between the candidate node and the stations not served by the candidate node.

5. The method of claim 1, wherein the leakage of each candidate node is determined based on a nominal transmit power spectral density (PSD) or an average transmit PSD of the candidate node.

6. The method of claim 1, wherein the metric for each candidate node further comprises a signal-to-leakage ratio (SLR) determined based on a desired signal for the candidate node at the station and the leakage of the candidate node.

7. The method of claim 1, further comprising:
   transmitting information for use by stations to compute metrics for association, the information comprising transmit power spectral density (PSD) of a node, or leakage of the node, or backhaul capacity of the node, or number of stations currently served by the node, or a combination thereof.

8. The method of claim 1, wherein the determining the at least one metric for the at least one candidate node and the selecting the serving node are performed by the station.

9. The method of claim 1, wherein the determining the at least one metric for the at least one candidate node and the selecting the serving node are performed by a current serving node of the station or by a designated entity.

10. The method of claim 1, wherein the station comprises a user equipment (UE) and the at least one candidate node comprises at least one base station, or at least one relay, or both at least one base station and at least one relay.

11. The method of claim 1, wherein the station comprises a relay and the at least one candidate node comprises at least one base station or at least one relay.

12. The method of claim 1, further comprising:
    determining at least one resource assigned to the station by the serving node, the at least one resource being from a set of resources allocated to the serving node by resource partitioning, the resource partitioning taking into consideration the serving node selected for the station; and
    communicating between the station and the serving node on the at least one resource.

13. A method for wireless communication, comprising:
    determining at least one metric for at least one candidate node for possible association by a station, wherein a metric for each candidate node is determined based on a leakage of the candidate node and the metric for each candidate node comprises a throughput-to-leakage ratio (TLR) determined based on an estimated throughput, associated with the station, for the candidate node and the leakage of the candidate node; and
    selecting a serving node for the station from among the at least one candidate node based on the at least one metric.

14. The method of claim 13, wherein the throughput of the station for the candidate node is estimated based on geometry achieved by the station for the candidate node.

15. The method of claim 13, wherein the throughput of the station for the candidate node is estimated based on resources assigned to the station by the candidate node, transmit power spectral density (PSD) levels of the candidate node for the assigned resources, and channel gain between the candidate node and the station.

16. The method of claim 13, wherein the throughput of the station for the candidate node is estimated based on backhaul capacity of the candidate node, or the number of stations currently served by the candidate node, or both.

17. An apparatus for wireless communication, comprising:
    means for determining at least one metric for at least one candidate node for possible association by a station, wherein a metric for each candidate node is determined based on a leakage of the candidate node and the metric for each candidate node comprises a geometry-to-leakage ratio (GLR) determined based on a geometry, associated with the station, for the candidate node and the leakage of the candidate node; and means for selecting a serving node for the station from among the at least one candidate node based on the at least one metric.

18. The apparatus of claim 17, wherein the leakage of each candidate node comprises interference due to the candidate node at stations not served by the candidate node and excluding the station.

19. The apparatus of claim 17, wherein the metric for each candidate node further comprises a signal-to-leakage ratio (SLR) determined based on a desired signal for the candidate node at the station and the leakage of the candidate node.

20. The apparatus of claim 17, further comprising:
means for transmitting information for use by stations to compute metrics for association, the information comprising transmit power spectral density (PSD) of a node, or leakage of the node, or backhaul capacity of the node, or number of stations currently served by the node, or a combination thereof.

21. The apparatus of claim 17, further comprising:
means for determining at least one resource assigned to the station by the serving node, the at least one resource being from a set of resources allocated to the serving node by resource partitioning, the resource partitioning taking into consideration the serving node selected for the station; and
means for communicating between the station and the serving node on the at least one resource.

22. An apparatus for wireless communication, comprising:
means for determining at least one metric for at least one candidate node for possible association by a station, wherein a metric for each candidate node is determined based on a leakage of the candidate node and the metric for each candidate node comprises a throughput-to-leakage ratio (TLR) determined based on an estimated throughput associated with the station, for the candidate node and the leakage of the candidate node; and
means for selecting a serving node for the station from among the at least one candidate node based on the at least one metric.

23. An apparatus for wireless communication, comprising:
at least one processor configured
to determine at least one metric for at least one candidate node for possible association by a station, wherein a metric for each candidate node is determined based on a leakage of the candidate node and the metric for each candidate node comprises a geometry-to-leakage ratio (GLR) determined based on a geometry, associated with the station, for the candidate node and the leakage of the candidate node, and
to select a serving node for the station from among the at least one candidate node based on the at least one metric.

24. The apparatus of claim 23, wherein the leakage of each candidate node comprises interference due to the candidate node at stations not served by the candidate node and excluding the station.

25. The apparatus of claim 23, wherein the metric for each candidate node further comprises a signal-to-leakage ratio (SLR) determined based on a desired signal for the candidate node at the station and the leakage of the candidate node.

26. The apparatus of claim 23, wherein the at least one processor is configured to transmit information for use by stations to compute metrics for association, the information comprising transmit power spectral density (PSD) of a node, or leakage of the node, or backhaul capacity of the node, or number of stations currently served by the node, or a combination thereof.

27. The apparatus of claim 23, wherein the at least one processor is configured to determine at least one resource assigned to the station by the serving node, the at least one resource being from a set of resources allocated to the serving node by resource partitioning, the resource partitioning taking into consideration the serving node selected for the station, and to communicate between the station and the serving node on the at least one resource.

28. An apparatus for wireless communication, comprising:
at least one processor configured
to determine at least one metric for at least one candidate node for possible association by a station, wherein a metric for each candidate node is determined based on a leakage of the candidate node and the metric for each candidate node comprises a throughput-to-leakage ratio (TLR) determined based on an estimated throughput, associated with the station, for the candidate node and the leakage of the candidate node, and
to select a serving node for the station from among the at least one candidate node based on the at least one metric.

29. A computer program product, comprising:
a non-transitory computer-readable medium comprising:
code for causing at least one computer to determine at least one metric for at least one candidate node for possible association by a station, wherein a metric for each candidate node is determined based on a leakage of the candidate node and the metric for each candidate node comprises a geometry-to-leakage ratio (GLR) determined based on a geometry, associated with the station, for the candidate node and the leakage of the candidate node, and
code for causing the at least one computer to select a serving node for the station from among the at least one candidate node based on the at least one metric.

30. A computer program product, comprising:
a non-transitory computer-readable medium comprising:
code for causing at least one computer to determine at least one metric for at least one candidate node for possible association by a station, wherein a metric for each candidate node is determined based on a leakage of the candidate node and the metric for each candidate node comprises a throughput-to-leakage ratio (TLR) determined based on an estimated throughput, associated with the station, for the candidate node and the leakage of the candidate node, and
code for causing the at least one computer to select a serving node for the station from among the at least one candidate node based on the at least one metric.

* * * * *